(12) United States Patent
Yamasaki et al.

(10) Patent No.: US 9,167,429 B2
(45) Date of Patent: Oct. 20, 2015

(54) VISIBLE LIGHT COMMUNICATION SYSTEM, COMMUNICATION TERMINAL AND SERVER

(71) Applicant: Panasonic Corporation, Osaka (JP)

(72) Inventors: Shigeaki Yamasaki, Osaka (JP); Yosuke Kondo, Osaka (JP); Eiji Shiohama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/191,866

(22) Filed: Feb. 27, 2014

(65) Prior Publication Data
US 2014/0250498 A1    Sep. 4, 2014

(30) Foreign Application Priority Data

Mar. 1, 2013   (JP) ................................. 2013-041079

(51) Int. Cl.
| | |
|---|---|
| H04L 9/00 | (2006.01) |
| H04W 12/06 | (2009.01) |
| H04L 9/08 | (2006.01) |
| H04L 9/32 | (2006.01) |
| G09C 5/00 | (2006.01) |
| H04B 10/116 | (2013.01) |
| H05B 37/02 | (2006.01) |
| G07C 9/00 | (2006.01) |

(52) U.S. Cl.
CPC ............... *H04W 12/06* (2013.01); *G09C 5/00* (2013.01); *H04B 10/116* (2013.01); *H04L 9/00* (2013.01); *H04L 9/0852* (2013.01); *H04L 9/32* (2013.01); *H05B 37/0272* (2013.01); *G07C 9/00309* (2013.01); *G07C 9/00571* (2013.01)

(58) Field of Classification Search
USPC .................................... 713/155–159
See application file for complete search history.

(56) References Cited

U.S. PATENT DOCUMENTS

| | | | |
|---|---|---|---|
| 8,248,467 B1 | 8/2012 | Ganick et al. | |
| 2006/0214815 A1 | 9/2006 | Komatsu | |
| 2008/0118099 A1* | 5/2008 | Alattar et al. | 382/100 |

FOREIGN PATENT DOCUMENTS

| | | |
|---|---|---|
| EP | 1 705 880 A2 | 9/2006 |
| JP | 2008-027336 A | 2/2008 |
| JP | 2010-117301 A | 5/2010 |
| JP | 2011-244141 A | 12/2011 |
| WO | WO 2014/137782 A1 | 9/2014 |

OTHER PUBLICATIONS

European Search Report for corresponding European Application No. 14157269.3 dated Mar. 27, 2015.

* cited by examiner

*Primary Examiner* — Ghazal Shehni
(74) *Attorney, Agent, or Firm* — Renner, Otto, Boisselle & Sklar, LLP (57) ABSTRACT

A communication module of a communication terminal is configured not to output to a control module, service information provided from a second server whose server ID is not registered in a first server. The communication module is configured to receive an authentication code from the first server, and to transmit ID information and terminal identification information to the second server. When the terminal identification information received from the communication module matches the terminal identification information received from the first server, the second server is configured to reply the authentication code and the service information to the communication module. When the authentication code received from the first server matches the authentication code received from the second server, the communication module is configured to output the service information to the control module.

19 Claims, 5 Drawing Sheets

VISIBLE LIGHT COMMUNICATION SYSTEM, COMMUNICATION TERMINAL AND SERVER

TECHNICAL FIELD

The present invention relates generally to visible light communication systems, communication terminals and servers and, more particularly, to a visible light communication system using visible light as a communication medium, a communication terminal and a server.

BACKGROUND ART

Recently, a visible light communication system (a visible light ID system) is proposed, which is configured to modulate visible light (illumination light) emitted from a lighting apparatus (a transmitter) to transmit unique ID information or the like to the lighting fixture, and to demodulate the ID information with a receiver receiving the visible light. Examples of a utilization form of the visible light communication system include course guidance (navigation) in a facility, introduction of exhibits in a gallery and a museum and the like (referring Japanese unexamined patent application publication No. 2010-117301, hereinafter referred to as "documents 1", and Japanese unexamined patent application publication No. 2011-244141, hereinafter referred to as "document 2").

In the conventional examples described in the documents 1 and 2, the receiver holds (stores) the information about the navigation or the introduction of the exhibits. On the other hand, a system is also proposed, in which a server holds (stores) the information about the navigation or the introduction of the exhibits, and a receiver receives ID information by visible light communication and transmits the ID information to the server by wireless communication, and the server replies the information corresponding to the ID information to the receiver.

By the way, as the above-mentioned utilization form, various information is made to correspond to multiple pieces of ID information, respectively, and thereby it is possible to provide various services. Here, in the above-mentioned visible light communication system, it is supposed that a service-provider providing the various services to a user who possesses the receiver is different from a manager managing the transmitter (the lighting fixture).

The user receives the ID information from the manager by the visible light communication, and notifies the service-provider of the ID information by wireless communication, and then receives information (service information) corresponding to the ID information from the service-provider. Therefore, the user can utilize the various services. In this case, the user will pay money to the service-provider for the provided service, and the service-provider will pay money to the manager for use of the ID information.

However, in the above-mentioned conventional example, the manager does not participate in the notice of the ID information from the user to the service-provider and the reply of the service information from the service-provider to the user. Therefore, there is a fear that the service-provider not performing an agreement (a contract) to the manager about the use of the ID information provides the service without permission, and the service-provider will not pay money to the manager for use of the ID information.

SUMMARY OF INVENTION

The present invention has achieved in view of the above problem, and it is an object thereof to prevent unauthorized use of ID information by a third person.

A visible light communication system according to one aspect of the present invention includes a visible light communication device, a communication terminal, a first server, and at least one second server. The visible light communication device is configured to transmit at least one piece of unique ID information by visible light communication. The communication terminal is assigned with unique terminal identification information, and is configured to receive the ID information by the visible light communication. The first server is configured to memorize the terminal identification information assigned to the communication terminal, and to perform wireless communication through a medium of an electric wave with the communication terminal. The second server is assigned with unique server identification information, and is configured to memorize service information corresponding to the ID information, and to perform wireless communication through a medium of an electric wave with the communication terminal. The communication terminal includes a communication module and a control module. The communication module is configured to perform the visible light communication and the wireless communication. The control module is configured to memorize the server identification information, and to provide a service to a user. The service corresponds to the service information. The first server is configured to memorize the server identification information assigned to the second server. When the terminal identification information and the server identification information that are received from the communication terminal match the terminal identification information and the server identification information that are memorized in the first server, respectively, the first server is configured to authenticate the communication terminal and the second server. After the communication terminal is authenticated by the first server through the terminal identification information, the communication module is configured to transmit the ID information received from the visible light communication device, the server identification information received from the control module, and personal information included in the communication terminal, to the first server by the wireless communication. The first server is configured to memorize the personal information. When the ID information, the server identification information, and the personal information that are received from the communication module by the wireless communication match the ID information, the server identification information, and the personal information that are memorized in the first server, respectively, the first server is configured to generate an authentication code. The first server is configured to transmit the generated authentication code and the terminal identification information to the communication module and the second server by the wireless communication. The communication module is configured to receive the authentication code transmitted by the first server, and then to transmit the ID information and the terminal identification information to the second server by the wireless communication. When the terminal identification information received from the communication module matches the terminal identification information received from the first server, the second server is configured to reply the authentication code and the service information to the communication module. When the authentication code received from the first server matches the authentication code received from the second server, the communication module is configured to output the service information received from the second server, to the control module.

Preferably, in the visible light communication system, the personal information is the terminal identification information assigned to the communication terminal.

Preferably, in the visible light communication system, the personal information is attribute information of the user.

Preferably, in the visible light communication system, the first server is configured to generate the authentication code attached with an expiration date, and the communication module and the second server are configured to cancel the authentication code in which the expiration date passed.

Preferably, in the visible light communication system, the at least one piece of ID information includes multiple pieces of ID information, and the first server is configured to generate the authentication code for each of the multiple pieces of ID information.

Preferably, in the visible light communication system, the at least one second server includes a plurality of second servers, and the first server is configured to memorize multiple pieces of server identification information respectively assigned to the plurality of second servers, and to generate the authentication code for each of the multiple pieces of server identification information.

Preferably, in the visible light communication system, the at least one piece of ID information includes multiple pieces of ID information, and the second server is configured to divide the multiple pieces of ID information into a plurality of groups having two or more pieces of ID information that are mutually related, and to store the server identification information for each of the plurality of groups.

Preferably, in the visible light communication system, the first server is configured to memorize multiple pieces of personal information as the personal information, and to generate the authentication code for each of the multiple pieces of personal information.

Preferably, in the visible light communication system, the first server is configured to include database including authentication information that is generated by combining the ID information, the server identification information, and the personal information.

A communication terminal according to another aspect of the present invention, is assigned with unique terminal identification information, is capable of receiving ID information unique to a visible light communication device from the visible light communication device by visible light communication, and performs wireless communication through a medium of an electric wave with a first server and a second server. The communication terminal includes a communication module and a control module. The communication module is configured to perform the visible light communication and the wireless communication. The control module is configured to memorize server identification information unique to the second server, and to provide a service to a user. The service corresponds to the service information provided by the second server. The communication module is configured to transmit the terminal identification information and the server identification information to the first server, and then to transmit the ID information received from the visible light communication device, the server identification information received from the control module, and personal information included in the communication terminal, to the first server by the wireless communication, after the communication terminal is authenticated by the first server through the terminal identification information. The communication module is configured to receive an authentication code transmitted by the first server, and then to transmit the ID information and the terminal identification information to the second server by the wireless communication. The communication module is configured to output the service information received from the second server, to the control module, when the authentication code received from the first server matches the authentication code received from the second server.

A server according to yet another aspect of the present invention, is capable of performing wireless communication through a medium of an electric wave with a communication terminal and another server, and memorizes terminal identification information assigned to the communication terminal, server identification information assigned to the other server, personal information included in the communication terminal, and ID information unique to a visible light communication device. The server is configured to authenticate the communication terminal and the other server, when the terminal identification information and the server identification information that are received from the communication terminal match the memorized terminal identification information and server identification information, respectively. The server is configured to generate an authentication code when the ID information unique to the visible light communication device, the server identification information, and the personal information that are received from the communication terminal by the wireless communication match the memorized ID information, server identification information, and personal information, respectively, and to transmit the generated authentication code and the terminal identification information to the communication terminal and the other server by the wireless communication.

The visible light communication system according to the aspect of the present invention is configured so that the communication module of the communication terminal does not output to the control module, the service information provided by the second server whose server identification information is not registered in the first server. Therefore, in the visible light communication system according to the aspect of the present invention, it is possible to prevent unauthorized use of the ID information by a third person who is not permitted from the manager managing the visible light communication device and the first server.

BRIEF DESCRIPTION OF DRAWINGS

Preferred embodiments of the present invention will now be described in further details. Other features and advantages of the present invention will become better understood with regard to the following detailed description and accompanying drawings where.

DESCRIPTION OF EMBODIMENTS

Hereinafter, a visible light communication system according to an embodiment of the present invention is described in detail referring to drawings.

Figure 1:
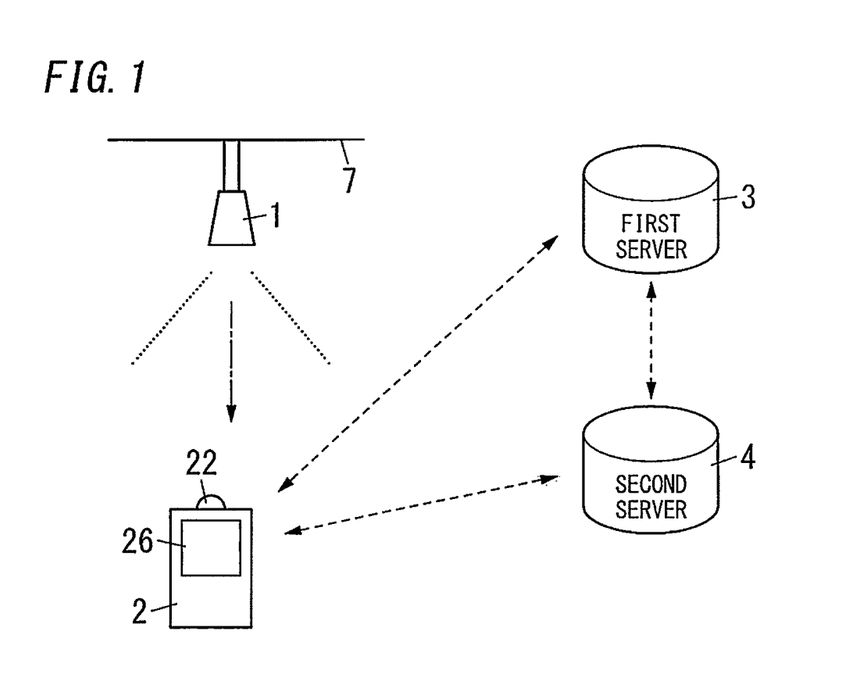
FIG. 1 is a system configuration diagram illustrating a visible light communication system according to an embodiment of the present invention.

As shown in FIG. 1, the visible light communication system according to the embodiment includes a visible light communication device 1, a communication terminal 2, a first server 3, and a second server 4.

The visible light communication device 1 according to the embodiment is a lighting apparatus (a down light) hung from a ceiling 7, and is configured to modulate visible light (illumination light) emitted from a lighting source (for example, a light emitting diode) to transmit unique ID information (mentioned later) constantly. That is, the visible light communication device 1 is configured to transmit the unique ID information by visible light communication. FIG. 1 shows only one visible light communication device 1, but in actual applications, a large number of visible light communication devices 1 may be arranged along a passage or the like.

Figure 2A:
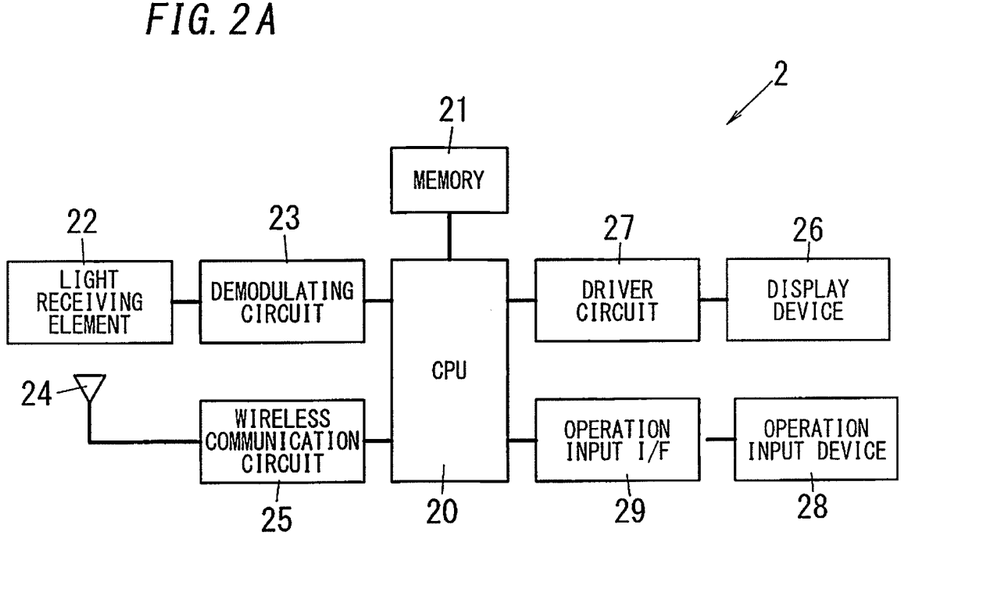
FIG. 2A is a block diagram of a communication terminal according to the embodiment of the present invention.

The communication terminal 2 includes a portable computer system that has functions for performing visible light communication and wireless communication through a medium of an electric wave, and is formed into such dimensions and a shape that a person can hold it by his or her hand. The communication terminal 2 is configured to receive ID information by the visible light communication. As shown in FIG. 2A, the communication terminal 2 includes a CPU (Central Processing Unit) 20, a memory 21, a light receiving element 22, a demodulating circuit 23, an antenna 24, a wireless communication circuit 25, a display device 26, a driver circuit 27, an operation input device 28, and an operation input interface (I/F) 29. The communication terminal 2 is assigned with unique terminal identification information so that the communication terminal 2 is able to be distinguished from other communication terminals. The terminal identification information is stored in the memory 21.

The light receiving element 22 receives the visible light emitted from the visible light communication device 1 and converts the visible light into an electric signal. The light receiving element 22 is, for example, a photodiode or a phototransistor. The demodulating circuit 23 is configured to demodulate ID information from the electric signal, which is output by the light receiving element 22, and then output the ID information to the CPU 20. The wireless communication circuit 25 is configured to demodulate a desired wireless communication frame from an electric wave (a received signal), which is received with the antenna 24, and then output the wireless communication frame to the CPU 20. Besides, the wireless communication circuit 25 is configured to transmit, from the antenna 24, a transmitting signal generated by modulating the wireless communication frame output from the CPU 20. Because the demodulating circuit 23 and the wireless communication circuit 25 are capable of being provided by using well-known technology conventionally, an illustration and a description of a detailed circuit construction are omitted.

The display device 26 includes, for example, a liquid crystal display, and an organic electroluminescence display. The driver circuit 27 is configured to control the display device 26 in response to a control command given by the CPU 20, and cause the display device 26 to display a character, a map, an image, or the like. Because the display device 26 and the driver circuit 27 are capable of being provided by using well-known technology conventionally, an illustration and a description of a detailed circuit construction are omitted.

The operation input device 28 includes, for example, a push-button switch, a touch panel, or the like. The operation input I/F 29 is configured to represent an operational state of the operation input device 28 by operation input data and then output the operation input data to the CPU 20. Because the operation input device 28 and the operation input I/F 29 are capable of being provided by using well-known technology conventionally, an illustration and a description of a detailed circuit construction are omitted.

As shown in FIG. 1, the communication terminal 2 is formed into a flat rectangular box shape, and a screen of the display device 26 is exposed on a plane of a front side of the communication terminal 2, and the light receiving element 22 is provided at a tip of the communication terminal 2. The user may hold the communication terminal 2 as to turn the light receiving element 22 towards the visible light communication device 1 while turning the screen of the display device 26 towards himself or herself.

Figure 2B:
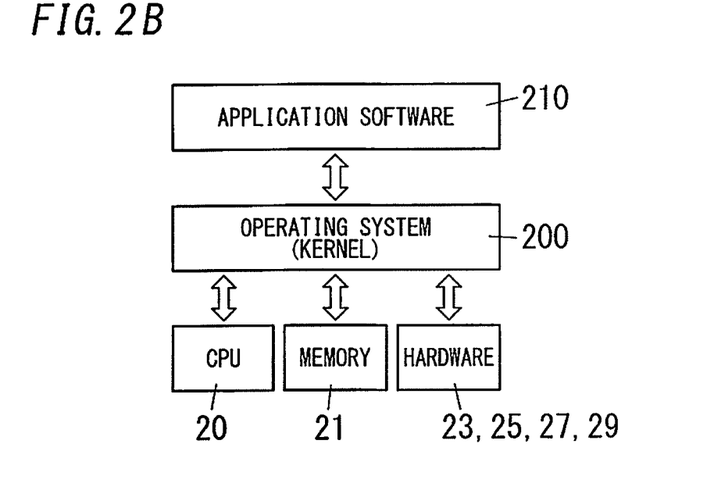
FIG. 2B is a block diagram of a main part of the communication terminal according to the embodiment of the present invention.

As shown in FIG. 2B, the CPU 20 is mounted with a well-known operating system (hereinafter referred to as an OS) 200 for clients conventionally. The OS (a Kernel in particular) 200 generates processes to execute application software 210. The generation of the processes includes an allocation of hardware resources such as a memory space, loading of a binary code of the software to the memory, and the start of executing the application software 210. In addition, the OS 200 includes an API (an application programming interface) and an ABI (an application binary interface) that are interfaces to operate the application software 210. The API is an interface for programming, and constitutes a rule when a program (software) is made. The ABI is an interface when compiled software invokes a function of the OS 200, and constitutes a rule when the processes are operated.

The first server 3 includes a general-purpose computing system, an operating system for servers, and software for servers. In addition, the first server 3 stores, as a database: unique terminal identification information (terminal ID) assigned to the communication terminal 2: unique server identification information (server ID) assigned to the second server 4: and ID information (visible light ID) transmitted from the visible light communication device 1, and manages them. Furthermore, the first server 3 has a function to perform wireless communication through a medium of an electric wave with the communication terminal 2, and a function to perform data communication (either wire communication or wireless communication may be used) with the second server 4.

The second server 4 includes a general-purpose computing system, an operating system for servers (a server OS), and software for servers, like the first server 3. The second server 4 is assigned with unique server identification information so that the second server 4 is able to be distinguished from the other server. The second server 4 memorizes the service information corresponding to the visible light ID and the server identification information of the second server 4. In addition, the second server 4 has a function to perform wireless communication through a medium of an electric wave with the communication terminal 2, and a function to perform data communication (either wire communication or wireless communication may be used) with the first server 3. By well-known server virtualization technology conventionally, one computing system may be divided into a plurality of virtual computing systems to realize the first server 3 and the second server 4 with each computing system.

Figure 3:
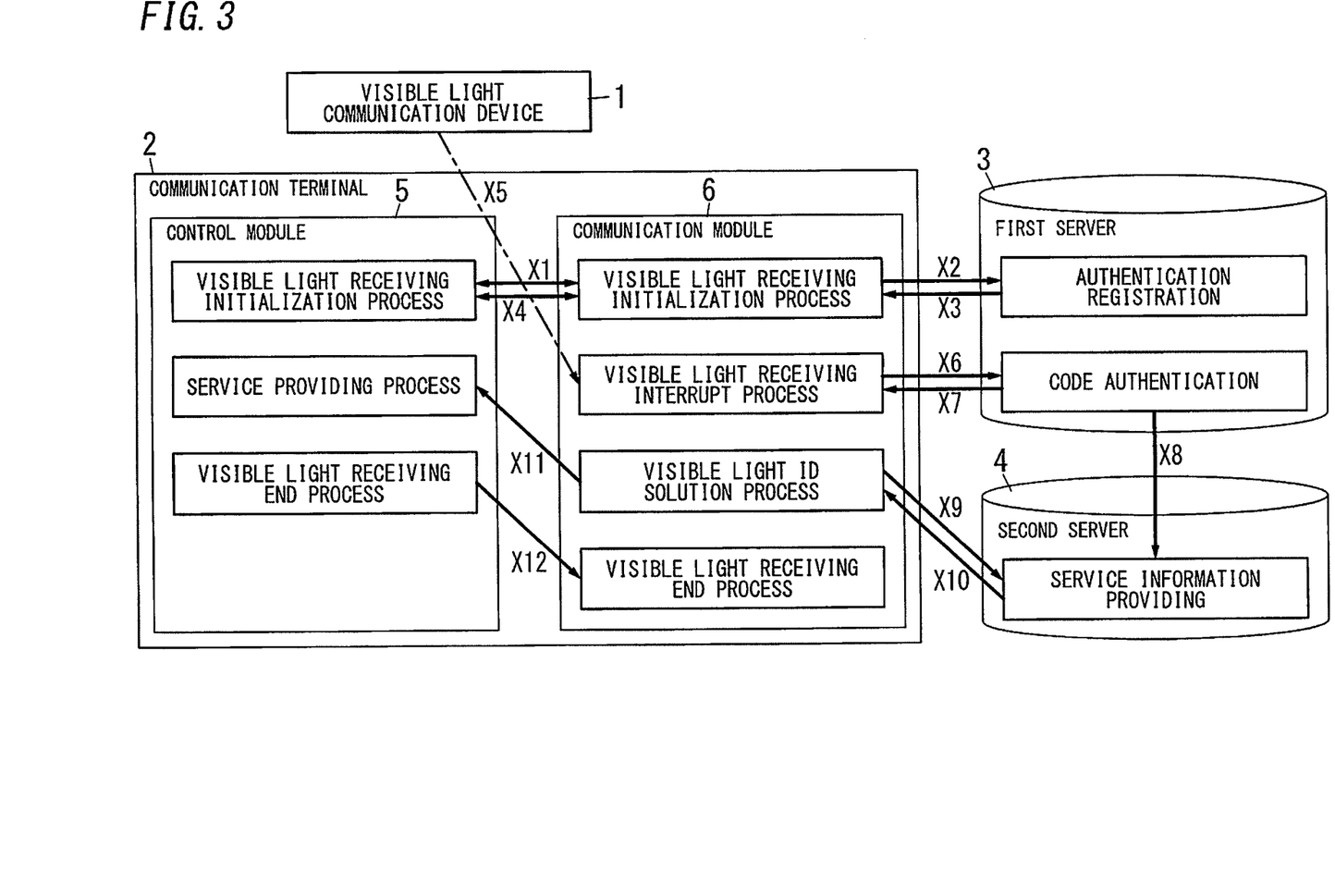
FIG. 3 is a flowchart for describing a behavior of the embodiment of the present invention.

Next, an operation of the visible light communication system according to the embodiment is described referring to FIG. 3. The communication terminal 2 shown in FIG. 3 includes a control module 5 and a communication module 6. The control module 5 memorizes the server ID of the second server 4, and provides a service to the user by using the service information. The communication module 6 performs the visible light communication and the wireless communication. The control module 5 is realized by the application software 210 executed by the OS 200. In addition, the communication module 6 may be realized by hardware or software. If the communication module 6 is realized by software, the communication module 6 is realized by the function (API) with which the OS 200 controls the device (the demodulating circuit 23) for the visible light communication and the device (the wireless communication circuit 25) for the wireless communication.

At first, when the application software 210 is activated, the control module 5 executes a visible light receiving initialization process. The control module 5 outputs the terminal ID and the server ID to the communication module 6 in the visible light receiving initialization process (X1). When receiving the terminal ID and the server ID, the communication module 6 executes a visible light receiving initialization process. The communication module 6 stores the terminal ID and the server ID that are received from the control module 5 as internal variables in the visible light receiving initialization process, and transmits the terminal ID and the server ID to the first server 3 with the wireless communication circuit 25 (X2).

When the terminal ID and the server ID that are received from the communication terminal 2 match the terminal ID and the server ID that are registered in the database, respectively, the first server 3 determines that authentication is successful. That is, the first server 3 authenticates the communication terminal 2 and the second server 4. On the other hand, when at least any one of the terminal ID and the server ID that are received from the communication terminal 2 does not match a corresponding one of the terminal ID and the server ID that are registered in the database, the first server 3 determines that authentication is unsuccessful. For example, when the server ID received from the communication terminal 2 does not match the server ID registered in the database although the terminal ID received from the communication terminal 2 matches the terminal ID registered in the database, respectively, the first server 3 determines that the authentication is unsuccessful. The first server 3 replies a result of the authentication (an authentication result, a determined result) to the communication terminal 2 by the wireless communication (X3). The result is whether the authentication is successful or unsuccessful.

The communication module 6 outputs the result received from the first server 3 to the control module 5 in the visible light receiving initialization process (X4), and then completes the visible light receiving initialization process. When the result received from the communication module 6 is that the authentication is unsuccessful, the control module 5 completes the processes with the application software 210, and when the result received from the communication module 6 is that the authentication is successful, the control module 5 does not complete the processes with the application software 210, in the visible light receiving initialization process.

The ID information (the visible light ID) transmitted by the visible light communication device 1 is received with the light receiving element 22 (X5), and then is demodulated with the demodulating circuit 23 to be output to the communication module 6. When receiving the visible light ID from the demodulating circuit 23, the communication module 6 executes a visible light receiving interrupt process. The communication module 6 transmits the terminal ID, the server ID, and the visible light ID to the first server 3 with the wireless communication circuit 25 in the visible light receiving interrupt process (X6). That is, after the communication terminal 2 is authenticated by the first server 3 through the terminal ID, the communication module 6 transmits the visible light ID received from the visible light communication device 1, the server ID received from the control module 5, and personal information assigned to a side of the communication terminal 2, to the first server 3 by the wireless communication. The personal information is the terminal ID assigned to the communication terminal 2.

When the terminal ID, the server ID, and the visible light ID that are received from the communication terminal 2 match the terminal ID, the server ID, and the visible light ID that are registered in the database, respectively, the first server 3 determines that the authentication is successful. On the other hand, when at least any one of the terminal ID, the server ID, and the visible light ID that are received from the communication terminal 2 does not match a corresponding one of the terminal ID, the server ID, and the visible light ID that are registered in the database, the first server 3 determines that the authentication is unsuccessful. For example, when the server ID received from the communication terminal 2 does not match the server ID registered in the database although the terminal ID and the visible light ID that are received from the communication terminal 2 match the terminal ID and the visible light ID that are registered in the database, respectively, the first server 3 determines that the authentication is unsuccessful. When determining that the authentication is successful, the first server 3 generates an authentication code, and then transmits the authentication code to the communication terminal 2 (X7). In addition, the first server 3 transmits the generated authentication code, and the terminal ID and the visible light ID of the communication terminal 2 determined that the authentication is successful, to the second server 4 (X8). That is, when the visible light ID, the server ID, and the terminal ID that are received from the communication module 6 by the wireless communication match the visible light ID, the server ID, and the terminal ID that are memorized in the first server 3, respectively, the first server 3 generates the authentication code. Then, the first server 3 transmits the generated authentication code and the terminal ID to the communication module 6 and the second server 4 by the wireless communication. On the other hand, when determining that the authentication is unsuccessful, the first server 3 replies an error message to the communication terminal 2.

The communication module 6 stores the authentication code received from the first server 3 as endogenous variable in the visible light receiving interrupt process, and then completes the visible light receiving interrupt process. When receiving the error message from the first server 3, the communication module 6 outputs the result that the authentication is unsuccessful to the control module 5 in the visible light receiving interrupt process, and the control module 5 completes the processes with the application software 210.

After completing the visible light receiving interrupt process, the communication module 6 executes a visible light ID solution process. The communication module 6 transmits the terminal ID and the visible light ID to the second server 4 with the wireless communication circuit 25 in the visible light ID solution process (X9). That is, after receiving the authentication code transmitted from the first server 3, the communication module 6 transmits the visible light ID and the terminal ID to the second server 4 by the wireless communication.

The second server 4 determines whether or not the terminal ID and the visible light ID that are received from the communication terminal 2 are authenticated by the first server 3, that is, whether or not the terminal ID and the visible light ID that are received from the communication terminal 2 match the terminal ID and the visible light ID that are received from the first server 3. In other words, the second server 4 determines whether or not the terminal ID and the visible light ID are authenticated by the first server 3, for an inquiry from the communication terminal 2. When the terminal ID and the visible light ID are authenticated by the first server 3, the second server 4 transmits service information corresponding to the visible light ID, and the authentication code received from the first server 3, to the communication terminal 2 (X10). That is, when the terminal ID and the visible light ID that are received from the communication module 6 match the terminal ID and the visible light ID that are received from the first server 3, respectively, the second server 4 replies the authentication code and the service information to the communication module 6. On the other hand, when the terminal ID and the visible light ID are not authenticated by the first server 3, the second server 4 replies the error message to the communication terminal 2.

The communication module 6 determines in the visible light ID solution process whether or not the authentication code received from the second server 4 matches the authentication code stored as the endogenous variable. When two authentication codes match each other, the communication module 6 outputs the service information received from the second server 4, to the control module 5 (X11) in the visible light ID solution process, and then completes the visible light ID solution process. That is, when the authentication code received from the first server 3 matches the authentication code received from the second server 4, the communication module 6 outputs the service information received from the second server 4 to the control module 5. On the other hand, when the two authentication codes do not match each other, the communication module 6 cancels the service information received from the second server 4 in the visible light ID solution process, and then completes the visible light ID solution process.

When receiving the service information from the communication module 6, the control module 5 executes a service providing process. The control module 5 provides the service to the user. The service corresponds to the service information received from the communication module 6 in the service providing process. When, for example, the service information is positional information and map information, the control module 5 generates an image in which a position (a current position of the user) provided from the positional information is plotted on a map provided from the map information, in the service providing process. The control module 5 outputs the generated image to the driver circuit 27, and causes the driver circuit 27 to drive the display device 26 to display the image (the map and the current position) on the screen of the display device 26, in the service providing process. Therefore, the user holding the communication terminal 2 can know the current position of the user oneself by watching the map displayed on the screen of the display device 26.

The control module 5 waits for receiving the service information from the communication module 6 till the control module 5 receives the operation input of completing the processes with the application software 210 from the operation input I/F 29, in the service providing process. Then, whenever receiving the service information from the communication module 6, the control module 5 provides the service to the user by using the service information received from the communication module 6 in the service providing process.

On the other hand, while the application software 210 is executed, the communication module 6 executes the visible light receiving interrupt process whenever receiving the visible light ID from the demodulating circuit 23. The operations of the communication module 6, the control module 5, the first server 3, and the second server 4 after the execution of the visible light receiving interrupt processes are similar to those of the steps X5 to X11, and therefore the descriptions are omitted.

When receiving the operation input to complete the processes with the application software 210 from the operation input I/F 29, the control module 5 completes the service providing process, and then executes a visible light receiving end process. The control module 5 notifies the communication module 6 of the end of processes with the application software 210, in the visible light receiving end process (X12). Then, the control module 5 completes the processes with the application software 210.

When receiving the end notice from the control module 5, the communication module 6 executes the visible light receiving end process. The communication module 6 erases and initializes all the internal variables including the authentication code in the visible light receiving end process, and then completes the visible light receiving end process.

As mentioned above, in the above-mentioned embodiment, the communication module 6 of the communication terminal 2 is configured not to output to the control module 5, the service information provided from the second server 4 whose server ID is not registered in the first server 3. Therefore it is possible to prevent that a third person, who is not permitted by the manager managing the visible light communication device 1 and the first server 3, uses illegally the ID information of the visible light communication device 1.

Here, preferably, the authentication code is constituted to a content that is hard to be estimated from the terminal ID, the visible light ID, and the server ID, such as arbitrary random progression.

In addition, the first server 3 may be configured to generate the authentication code attached with an expiration date, and the communication module 6 and the second server 4 may be configured to cancel the authentication code in which the expiration date passed. That is, attaching the expiration date can reduce a risk that the third person acquires the authentication code illegally. The expiration date may not be generated by the first server 3. For example, a predetermined expiration date may be set so that the authentication code is canceled if the expiration date passes.

In addition, instead of generating the authentication code for each piece of ID information (visible light ID) as above mentioned, the first server 3 may generate the authentication code for each piece of server identification information (server ID) or terminal identification information (terminal ID). That is, a plurality of second servers 4 are provided, and the first server 3 may be configured to memorize multiple pieces of server identification information assigned to the plurality of second servers 4, respectively, and to generate the authentication code for each piece of server identification information. The first server 3 may be configured to memorize the multiple pieces of identification information as the terminal identification information, and to generate the authentication code for each piece of terminal identification information.

Figure 4:
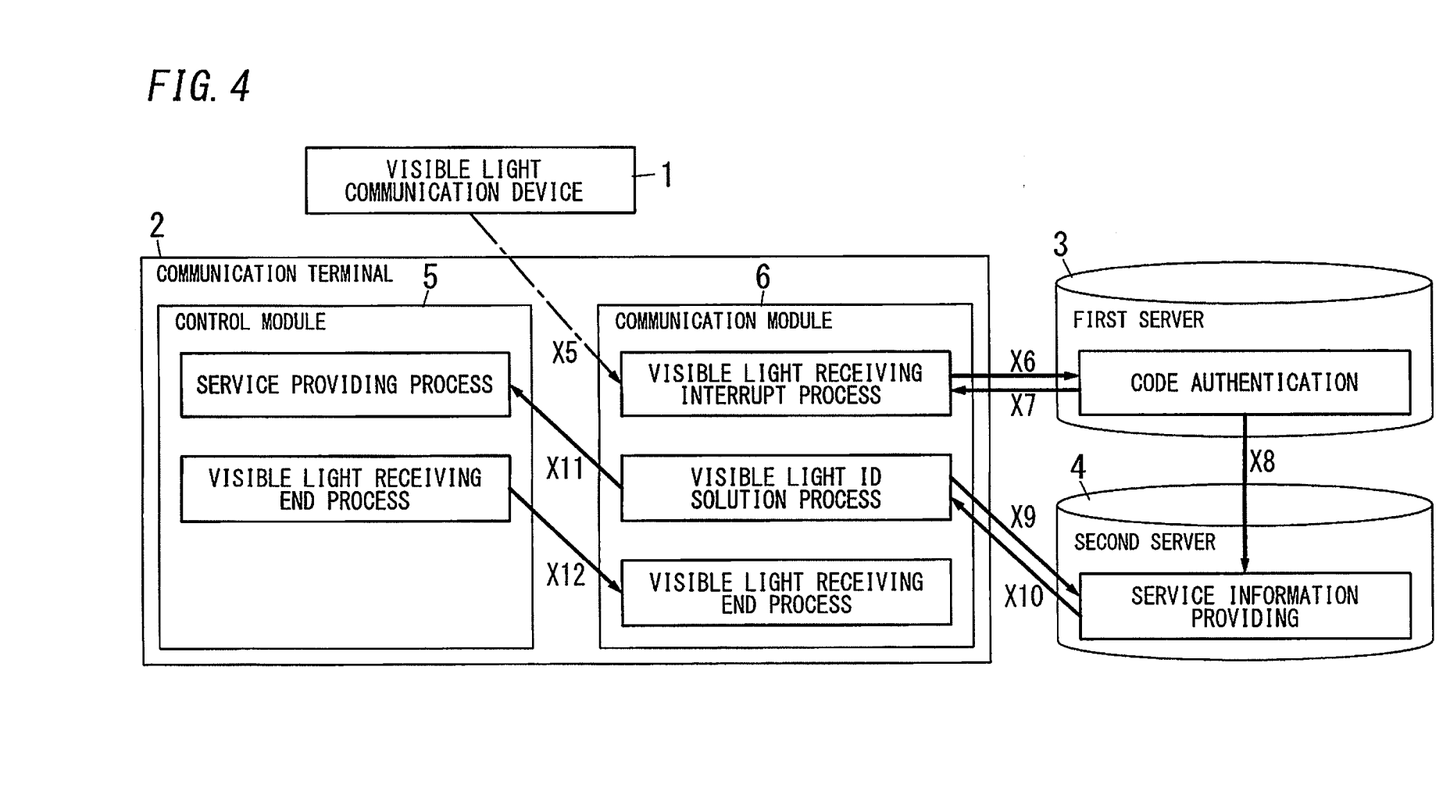
FIG. 4 is a flowchart for describing the behavior of the embodiment of the present invention.

For example, when the first server 3 generates the authentication code for each piece of the server ID, as shown in FIG. 4, the processes included in the visible light receiving interrupt process of the communication module 6 is different from those in a case where the first server 3 generates the authentication code for each piece of the ID information. That is, the communication module 6 determines with the internal variable whether or not the server ID of the second server 4 is authenticated by the first server 3 in the visible light receiving interrupt process. When the server ID is authenticated, the communication module 6 completes the visible light receiving interrupt process, and then executes the visible light ID solution process. On the other hand, when the server ID is not authenticated, the communication module 6 transmits the terminal ID and the server ID to the first server 3 with the wireless communication circuit 25, and demands the authentication to the first server 3, in the visible light receiving interrupt process (X6). Then, the communication module 6 stores the authentication code received from the first server 3 as the endogenous variable in the visible light receiving interrupt process, and then completes the visible light receiving interrupt process (X7).

A process of a code authentication show in FIG. 4 is similar to the process of the code authentication shown in FIG. 3. A process of providing service information shown in FIG. 4 is similar to the process of providing the service information shown in FIG. 3. A visible light ID solution process and a visible light receiving end process shown in FIG. 4 are similar to the visible light ID solution process and the visible light receiving end process shown in FIG. 3, respectively. A service providing process and a visible light receiving end process shown in FIG. 4 are similar to the service providing process and the visible light receiving end process shown in FIG. 3, respectively.

In this case, if the second server 4 is virtualized, multiple pieces of ID information (visible light ID) related to each other may be managed, and the multiple pieces of visible light ID related to each other may also be authenticated collectively as the server ID. That is, the second server 4 may be configured to divide the multiple pieces of ID information into a plurality of groups having two or more pieces of ID information that are mutually related, and to store the server identification information for each of the plurality of groups.

Figure 5:
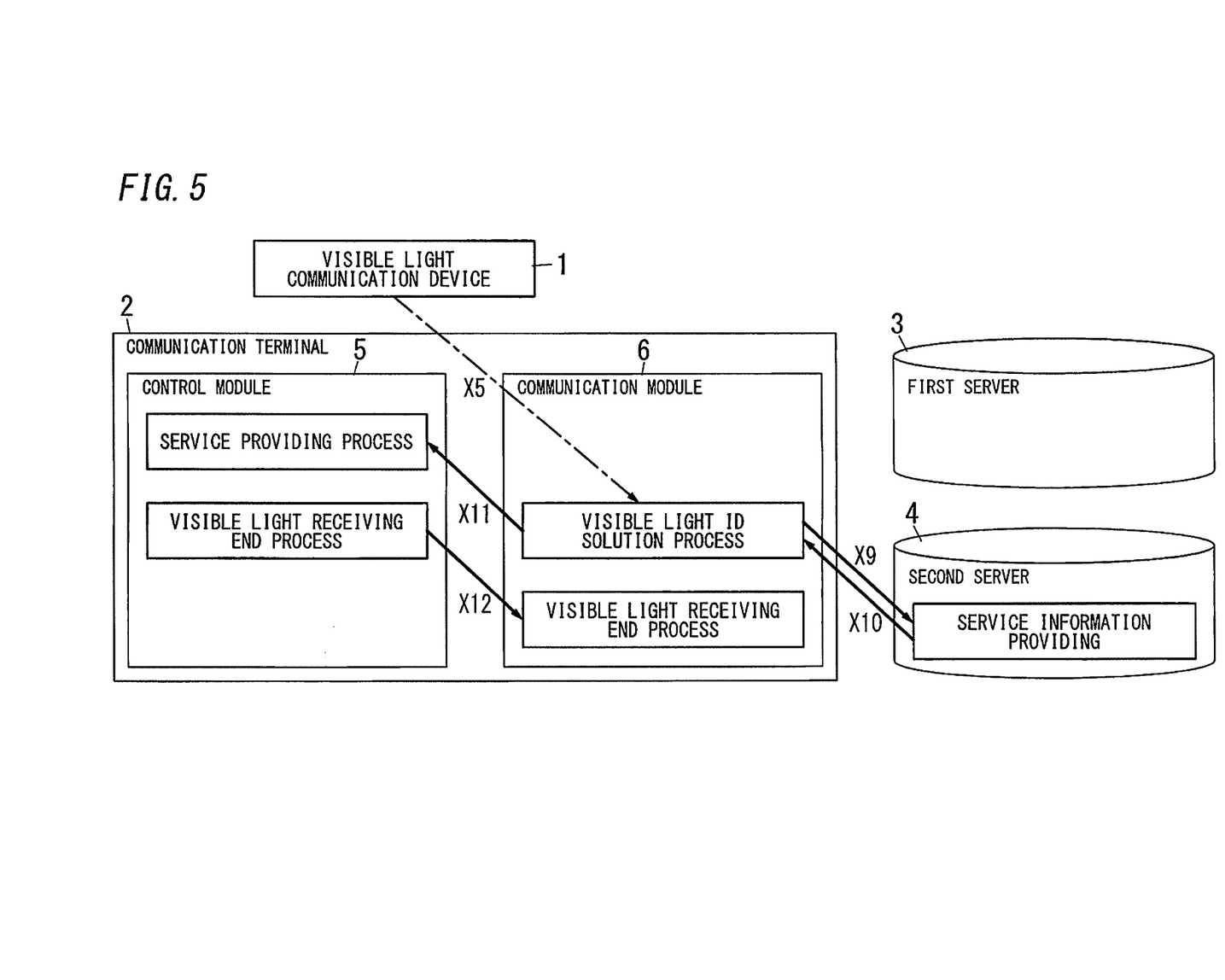
FIG. 5 is a flowchart for describing the behavior of the embodiment of the present invention.

When the first server 3 generates the authentication code for each piece of terminal ID, as shown in FIG. 5, the visible light receiving interrupt process of the communication module 6 is unnecessary. After performing the authentication registration and the code authentication (the generation and the transmission of the authentication code) initially, the first server 3 is not accessed till the communication terminal 2 completes the application software 210.

Processes of providing service information shown in FIG. 5 are similar to the processes of providing the service information shown in FIG. 3. A visible light ID solution process and a visible light receiving end process shown in FIG. 5 are similar to the visible light ID solution process and the visible light receiving end process shown in FIG. 3, respectively. A service providing process and a visible light receiving end process shown in FIG. 5 are similar to the service providing process and the visible light receiving end process shown in FIG. 3, respectively.

In a point of view to aim improvement of user's convenience, and to change the second server 4 providing the service for each application software 210, preferably, the control module 5 gets possible to change software in response to the service provided to the user. In a point of view to be capable of providing different service, preferably, the server ID (the identification information) of the second server 4 is memorized in the control module 5 directly or indirectly. Here, "directly" means to put the server ID into the application software 210 directly. On the other hand, "indirectly" means to take in the server ID through a third server in a case where the third server providing the server ID is disposed to be separated from the second server 4. In the case of "indirectly", the information included in the application software 210 is only information of the third server. In a point of view to provide the different service, preferably, multiple pieces of identification information of the second server 4 are memorized in the control module 5 directly or indirectly, and get possible to be changed in response to the provided service content.

By the way, in response to contents of the service that is provided by the application software 210, there is a case where it is decided whether or not the service is provided, in response to attribute (for example, sex, age, married or unmarried) of the user. In this case, the communication module 6 transmits the visible light ID, the server ID of the second server 4, and the attribute information of the user stored as the internal variable, to the first server 3 in the visible light receiving interrupt process, after the communication terminal 2 is authenticated by the first server 3 through the terminal ID. That is, after the communication terminal 2 is authenticated by the first server 3 through the terminal ID, the communication module 6 transmits the visible light ID received from the visible light communication device 1, the server ID received from the control module 5, and the attribute information of the user instead of the terminal ID assigned to the communication terminal 2, to the first server 3 by the wireless communication. When the visible light ID, the server ID, and the attribute information that are received from the communication terminal 2 match the visible light ID, the server ID, and the attribute information that are registered in the database, respectively, the first server 3 generates the authentication code, and then transmits the authentication code and the terminal identification information to the communication terminal 2 and the second server 4. Therefore, the first server 3 can generate the authentication code for each piece of attribute information of the user in a lump. In this case, the personal information assigned to the side of the communication terminal 2 is the attribute information of the user.

Here, preferably, the first server 3 is configured to include database including authentication information generated by combining the visible light ID, the server ID of the second server 4, and the terminal ID or the attribute information. For example, a combination with the terminal ID and the server ID, a combination with the terminal ID and the visible light ID, or a combination with the terminal ID, the server ID, and the visible light ID are registered in the database as the authentication information. Therefore, the first server 3 can authenticate the communication terminal 2 and the second server 4, and generate the authentication code, in various conditions.

The visible light communication system according to the embodiment described above includes the visible light communication device 1, the communication terminal 2, the first server 3, and the at least one second server 4. The visible light communication device 1 is configured to transmit the at least one piece of unique ID information (visible light ID) by the visible light communication. The communication terminal 2 is assigned with the unique terminal identification information (terminal ID), and is configured to receive the ID information by the visible light communication. The first server 3 is configured to memorize the terminal identification information assigned to the communication terminal 2, and to perform the wireless communication through the medium of the electric wave with the communication terminal 2. The second server 4 is assigned with the unique server identification information, and is configured to memorize the service information corresponding to the ID information, and to perform the wireless communication through the medium of the electric with the communication terminal 2. The communication terminal 2 includes the communication module 6 and the control module 5. The communication module 6 is configured to perform the visible light communication and the wireless communication. The control module 5 is configured to memorize the server identification information, and to provide the service to the user. The service corresponds to the service information. The first server 3 is configured to memorize the server identification information assigned to the second server 4. When the terminal identification information and the server identification information that are received from the communication terminal 2 match the terminal identification information and the server identification information that are memorized in the first server 3, respectively, the first server 3 is configured to authenticate the communication terminal 2 and the second server 4. After the communication terminal 2 is authenticated by the first server 3 through the terminal identification information, the communication module 6 is configured to transmit the ID information received from the visible light communication device 1, the server identification information received from the control module 5, and the personal information (the terminal identification information, the attribute information) included in the communication terminal 2, to the first server 3 by the wireless communication. The first server 3 in configured to memorize the personal information. When the ID information, the server identification information, and the personal information that are received from the communication module 6 by the wireless communication match the ID information, the server identification information, and the personal information that are memorized in the first server 3, respectively, the first server 3 is configured to generate the authentication code. The first server 3 is configured to transmit the generated authentication code and the terminal identification information to the communication module 6 and the second server 4 by the wireless communication. The communication module 6 is configured to receive the authentication code transmitted by the first server 3, and then to transmit the ID information and the terminal identification information to the second server 4 by the wireless communication. When the terminal identification information received from the communication module 6 matches the terminal identification information received from the first server 3, the second server 4 is configured to reply the authentication code and the service information to the communication module 6. When the authentication code received from the first server 3 matches the authentication code received from the second server 4, the communication module 6 is configured to output the service information received from the second server 4, to the control module 5.

Preferably, as the embodiment, the personal information is the terminal identification information assigned to the communication terminal 2.

Preferably, as the embodiment, the personal information is the attribute information of the user.

Preferably, as the embodiment, the first server 3 is configured to generate the authentication code attached with the expiration date, and the communication module 6 and the second server 4 are configured to cancel the authentication code in which the expiration date passed.

Preferably, as the embodiment, the at least one piece of ID information includes the multiple pieces of ID information, and the first server 3 is configured to generate the authentication code for each of the multiple pieces of ID information.

Preferably, as the embodiment, the at least one second server 4 includes a plurality of second servers 4, and the first server 3 is configured to memorize the multiple pieces of server identification information respectively assigned to the plurality of second servers 4, and to generate the authentication code for each of the multiple pieces of server identification information.

Preferably, as the embodiment, the at least one piece of ID information includes the multiple pieces of ID information, the second server 4 is configured to divide the multiple pieces of ID information into the a plurality of groups having two or more pieces of ID information that are mutually related, and to store the server identification information for each of the plurality of groups.

Preferably, as the embodiment, the first server 3 is configured to memorize the multiple pieces of personal information as the personal information, and to generate the authentication code for each of the multiple pieces of personal information.

Preferably, as the embodiment, the first server 3 is configured to include the database including the authentication information that is generated by combining the ID information, the server identification information, and the personal information.

Although the present invention has been described with reference to certain preferred embodiments, numerous modifications and variations can be made by those skilled in the art without departing from the true spirit and scope of this invention, namely claims.

The invention claimed is:

1. A visible light communication system comprising:
a visible light communication device configured to transmit at least one piece of unique ID information by visible light communication;
a communication terminal assigned with unique terminal identification information, and configured to receive the at least one piece of unique ID information by the visible light communication;
a first server configured to memorize the unique terminal identification information assigned to the communication terminal, and to perform wireless communication through a medium of an electric wave with the communication terminal; and
at least one second server assigned with unique server identification information, and configured to memorize service information corresponding to the at least one piece of unique ID information, and to perform wireless communication through another medium of another electric wave with the communication terminal,
wherein the communication terminal comprises:
a communication module configured to perform the visible light communication and the wireless communication; and
a control module configured to memorize the unique server identification information, and to provide a service to a user, the service corresponding to the service information,
wherein the first server is configured to memorize the unique server identification information assigned to the at least one second server, and to authenticate the communication terminal and the at least one second server, when the unique terminal identification information and the unique server identification information that are received from the communication terminal match the unique terminal identification information and the unique server identification information that are memorized in the first server, respectively,
wherein the communication module is configured to transmit the at least one piece of unique ID information received from the visible light communication device, the unique server identification information received from the control module, and personal information included in the communication terminal, to the first server by the wireless communication, after the communication terminal is authenticated by the first server through the unique terminal identification information, wherein the first server is configured to memorize the personal information, and when the at least one piece of unique ID information, the unique server identification information, and the personal information that are received from the communication module by the wireless communication match the at least one piece of unique ID information, the unique server identification information, and the personal information that are memorized in the first server, respectively, the first server is configured to generate an authentication code, and transmit the authentication code and the unique terminal identification information to the communication module and the at least one second server by the wireless communication, wherein the communication module is configured to receive the authentication code transmitted by the first server, and then to transmit the at least one piece of unique ID information and the unique terminal identification information to the at least one second server by the wireless communication, wherein the at least one second server is configured to reply the authentication code and the service information to the communication module, when the unique terminal identification information received from the communication module matches the unique terminal identification information received from the first server, and wherein the communication module is configured to output the service information received from the at least one second server, to the control module, when the authentication code received from the first server matches the authentication code received from the at least one second server.

2. The visible light communication system according to claim 1, wherein the personal information is the unique terminal identification information assigned to the communication terminal.

3. The visible light communication system according to claim 2,
wherein the first server is configured to generate the authentication code attached with an expiration date, and
wherein the communication module and the at least one second server are configured to cancel the authentication code in which the expiration date passed.

4. The visible light communication system according to claim 2,
wherein the at least one piece of ID information comprises multiple pieces of ID information, and
wherein the first server is configured to generate the authentication code for each of the multiple pieces of ID information.

5. The visible light communication system according to claim 2,
wherein the at least one second server comprises a plurality of second servers, and
wherein the first server is configured to memorize multiple pieces of server identification information respectively assigned to the plurality of second servers, and to generate the authentication code for each of the multiple pieces of server identification information.

6. The visible light communication system according to claim 2,
wherein the at least one piece of ID information comprises multiple pieces of ID information, and wherein the at least one second server is configured to divide the multiple pieces of ID information into a plurality of groups having two or more pieces of ID information that are mutually related, and to store the unique server identification information for each of the plurality of groups.

7. The visible light communication system according to claim 1, wherein the personal information is attribute information of the user.

8. The visible light communication system according to claim 7,
wherein the first server is configured to generate the authentication code attached with an expiration date, and
wherein the communication module and the at least one second server are configured to cancel the authentication code in which the expiration date passed.

9. The visible light communication system according to claim 7,
wherein the at least one piece of ID information comprises multiple pieces of ID information, and
wherein the first server is configured to generate the authentication code for each of the multiple pieces of ID information.

10. The visible light communication system according to claim 7,
wherein the at least one second server comprises a plurality of second servers, and
wherein the first server is configured to memorize multiple pieces of server identification information respectively assigned to the plurality of second servers, and to generate the authentication code for each of the multiple pieces of server identification information.

11. The visible light communication system according to claim 7,
wherein the at least one piece of ID information comprises multiple pieces of ID information, and
wherein the at least one second server is configured to divide the multiple pieces of ID information into a plurality of groups having two or more pieces of ID information that are mutually related, and to store the unique server identification information for each of the plurality of groups.

12. The visible light communication system according to claim 1,
wherein the first server is configured to generate the authentication code attached with an expiration date, and
wherein the communication module and the at least one second server are configured to cancel the authentication code in which the expiration date passed.

13. The visible light communication system according to claim 1,
wherein the at least one piece of ID information comprises multiple pieces of ID information, and
wherein the first server is configured to generate the authentication code for each of the multiple pieces of ID information.

14. The visible light communication system according to claim 1,
wherein the at least one second server comprises a plurality of second servers, and
wherein the first server is configured to memorize multiple pieces of server identification information respectively assigned to the plurality of second servers, and to generate the authentication code for each of the multiple pieces of server identification information.

15. The visible light communication system according to claim 1,
wherein the at least one piece of ID information comprises multiple pieces of ID information, and
wherein the at least one second server is configured to divide the multiple pieces of ID information into a plurality of groups having two or more pieces of ID information that are mutually related, and to store the unique server identification information for each of the plurality of groups.

16. The visible light communication system according to claim 1, wherein the first server is configured to memorize multiple pieces of personal information as the personal information, and to generate the authentication code for each of the multiple pieces of personal information.

17. The visible light communication system according to claim 1, wherein the first server is configured to comprise database including authentication information generated by combining the at least one piece of unique ID information, the unique server identification information, and the personal information.

18. A communication terminal, which is assigned with unique terminal identification information, capable of receiving ID information unique to a visible light communication device from the visible light communication device by visible light communication, and performing wireless communication through a medium of an electric wave with a first server and a second server, the communication terminal comprising:
a communication circuit configured to perform the visible light communication and the wireless communication; and
a control circuit configured to memorize server identification information unique to the second server, and to provide a service to a user, the service corresponding to service information provided by the second server,
wherein the communication circuit is configured to transmit the unique terminal identification information and the server identification information to the first server, and then to transmit the ID information received from the visible light communication device, the server identification information received from the control circuit, and personal information included in the communication terminal, to the first server by the wireless communication, after the communication terminal is authenticated by the first server through the unique terminal identification information,
wherein the communication circuit is configured to receive an authentication code transmitted by the first server, and then to transmit the ID information and the unique terminal identification information to the second server by the wireless communication,
wherein the communication circuit is configured to output the service information received from the second server, to the control circuit, when the authentication code received from the first server matches the authentication code received from the second server.

19. A server which is capable of performing wireless communication through a medium of an electric wave with a communication terminal and another server, the server comprising:
a memory having stored therein terminal identification information assigned to the communication terminal, server identification information assigned to the another server, personal information included in the communication terminal, and ID information unique to a visible light communication device,
wherein the server is configured to authenticate the communication terminal and the another server, when the terminal identification information and the server identification information that are received from the communication terminal match the terminal identification information and server identification information that are stored in the memory, respectively,
wherein the server is configured to generate an authentication code when the ID information unique to the visible light communication device, the server identification information, and the personal information that are received from the communication terminal by the wireless communication match the ID information, server identification information, and personal information that are stored in the memory, respectively, and to transmit the authentication code and the terminal identification information to the communication terminal and the another server by the wireless communication.

* * * * *